Patented Sept. 5, 1939

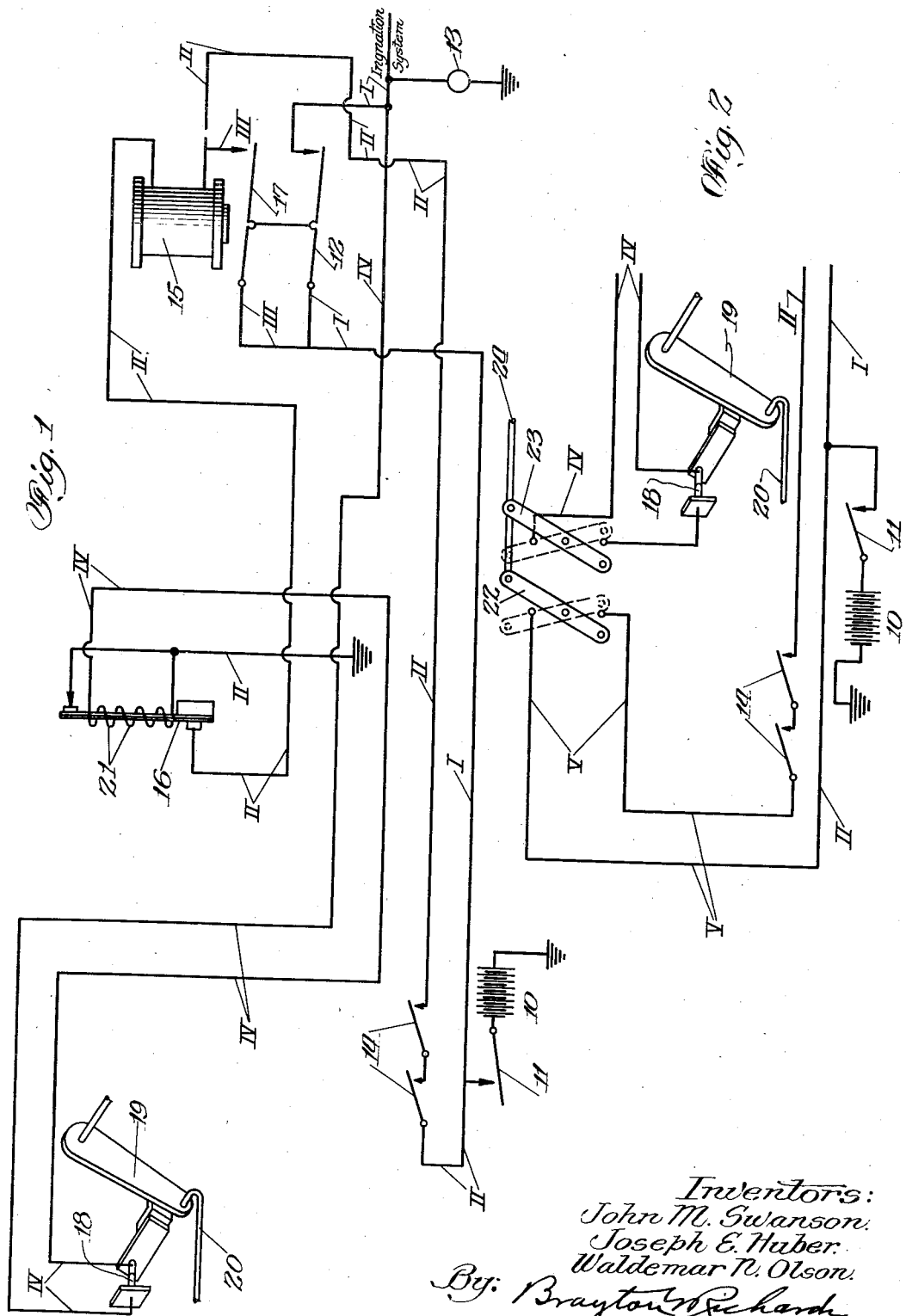

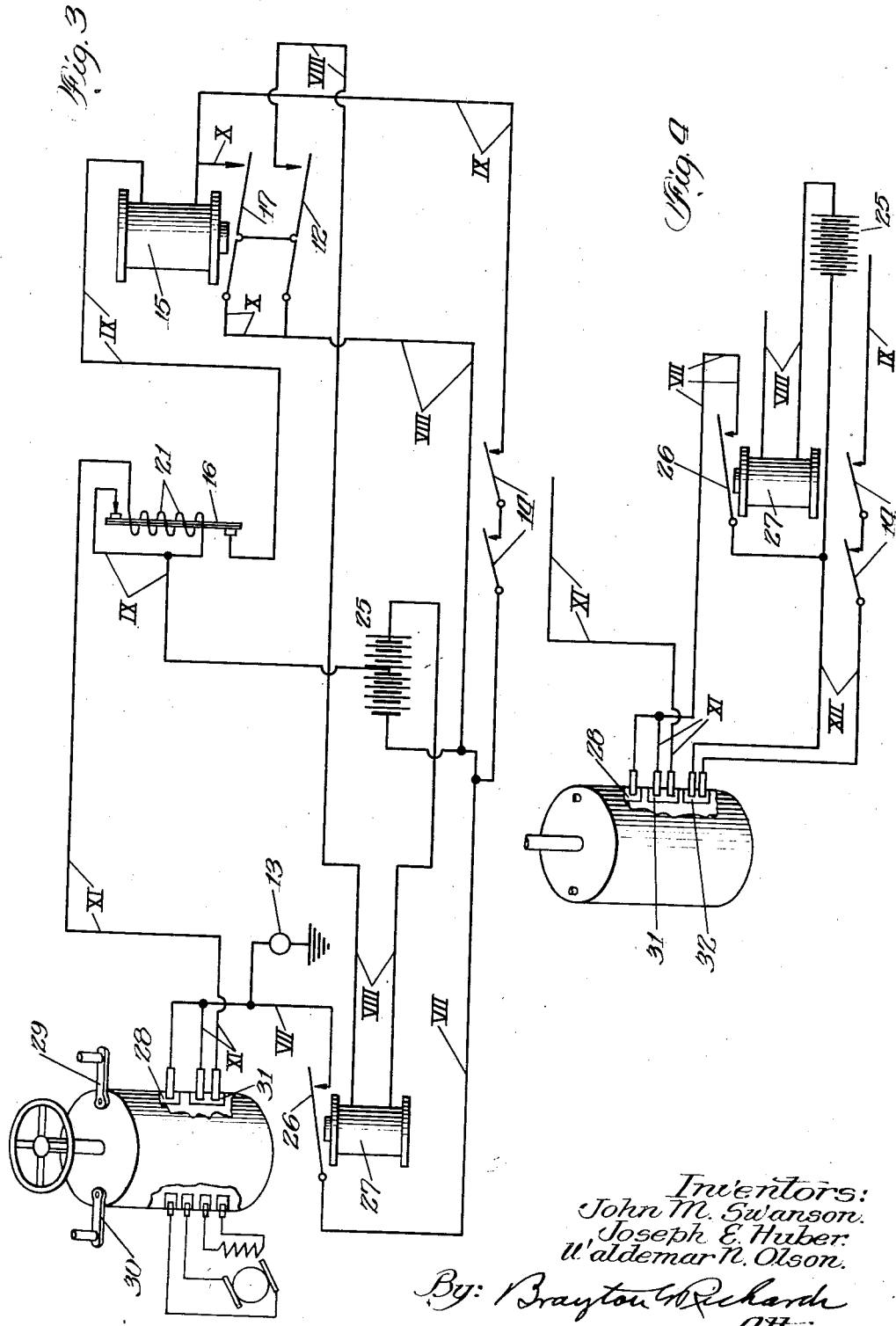

2,172,264

UNITED STATES PATENT OFFICE 2,172,264

POWER-PROPELLED VEHICLE

John M. Swanson, Oak Park, Joseph E. Huber, Chicago, and Waldemar N. Olson, Brookfield, Ill.; said Olson assignor to Reynolds Electric Company, Chicago, Ill., a corporation of Illinois Application November 4, 1937, Serial No. 172,860

19 Claims. (Cl. 123—146.5)

The invention relates to improvements in power propelled vehicles and has for its primary object the provision of an improved arrangement for operating such vehicles so constructed and arranged as to prevent unauthorized driving or operation thereof and thereby greatly adding to the safety with which such vehicles may be operated.

Another object of the invention is the provision of an arrangement of the character indicated so constructed and arranged as to minimize the power and the time consumed in the normal operation thereof.

Other objects will appear hereinafter.

The invention consists in the combinations and arrangements of parts hereinafter described and claimed.

The invention will be best understood by reference to the accompanying drawings forming a part of this specification and in which:

Fig. 1 is a diagrammatic view illustrating parts and electric circuits employed in the application of the invention to an ordinary automobile or truck driven by an ordinary explosive engine;

Fig. 2 is a view illustrating an addition to the arrangement illustrated in Fig. 1;

Fig. 3 is a diagrammatic view illustrating application of the invention to an ordinary automobile or truck driven by an electric motor; and Fig. 4 is a similar view of an addition to the arrangement shown in Fig. 3.

The embodiment of the invention illustrated in Fig. 1 comprises an ignition circuit I operatively connected with the usual automobile battery 10 through the usual key-operable dashboard switch 11 and including a magnetic switch 12 as shown, said circuit leading to the usual and ordinary ignition system of the automobile which requires no further description here.

For convenience in indicating when the ignition circuit is closed a dash-board light 13 may be connected as shown with the ignition circuit I so as to be lighted when the ignition circuit is closed.

A circuit II is connected as shown with the battery 10 in parallel with the circuit I and includes manually operable switches 14, electro-magnet 15 and thermostatic switch 16 as indicated. The switches 14 are preferably in the form of push buttons normally held open by springs and preferably concealed on the roof of the car, under the edge of the seat or other readily accessible concealed locations so that the driver of the car may readily close the circuit II.

Another circuit III is arranged in parallel with ignition circuit I to include a magnetic switch 17 operatively associated with the electro-magnet 15 and connected for simultaneous operation with the switch 12 as indicated. The circuit III also includes as shown the electro-magnet 15 and the thermostatic switch bar 16 as shown. Another circuit IV is arranged in parallel with the ignition circuit I and includes the switch 18 operable by a swinging lever 19 which in turn is operatively connected by the link 20 to the throttle valve of the automobile. The circuit IV also includes the heating coil 21 of the thermostatic switch as shown. Ordinarily the switch bar 16 will be constructed and arranged in well known manner so as to compensate for variations in atmospheric temperatures and thereby render the accurate operation thereof independent of atmospheric changes.

In operation with the parts as indicated in Fig. 1, which are the normal positions of the parts when the automobile is stopped and at rest, the automobile is started by the driver first closing dash-board switch 11 and then simultaneously closing the switches 14 thereby closing circuit II through the electro-magnet 15 and switch bar 16 to the ground. This at once excites electro-magnet 15 to close switches 17 and 12 thereby closing circuits I and II. Immediately thereafter the driver operates the throttle valve to start the automobile engine, open the throttle valve and open the switch 18, thereby breaking the circuit IV through the heating coil 21 of the thermostatic switch. Thus the ignition circuit I will be closed and held closed by the operation of circuit III on the electro-magnet as long as circuit III remains unbroken and whereby the automobile may be operated, manipulated and driven in the ordinary way. When the throttle valve is permitted to close to idling or stopping position the switch 18 is closed thereby closing circuit IV and establishing a circuit through the heating coil 21 of the thermostatic switch bar 16. After the lapse of a short period of time the coil 21 will heat the switch bar 16 sufficiently to cause bending of the same to open or break both of the circuits II and III thereby de-energizing electro-magnet 15 and causing the switches 12 and 17 to open and break the ignition circuit I. In this manner whenever the driver of the automobile brings the same to a stop by permitting the throttle valve to return to its idling or stopping position the ignition circuit of the automobile will be automatically broken thus effectively preventing operation of the automobile by unauthorized persons unless and until the secret or concealed switches 14 are simultaneously pushed or closed by someone knowing their location. In this way unauthorized starting of the automobile by children, thieves or others is prevented, thus adding to the safety of operation thereof and at the same time the automatic stopping of the engine insured thus saving fuel and at the same time further adding to the safety of operation.

In the arrangement illustrated in Fig. 2 an addition or extension V is provided for the circuit II and a switch lever 22 arranged as shown for closing said extension circuit and circuit II. The switch lever 22 co-operates with another switch lever 23 which is arranged as shown to open and close an extension circuit VI which thereby controls circuit IV. Switch levers 22 and 23 are connected for simultaneous operation by link 24 which is connected with the gear shift lever of the automobile or truck in such manner that when the gear shift lever is in neutral position the circuit extensions V and VI will be closed, but open in all other positions of said gear shift lever. Thus the circuits II and IV can only be closed as explained above when the gear shift lever of the automobile is in neutral position, that is in normal position for stopping the automobile or truck. This arrangement adds another factor of safety and also prevents operation of the starter when the motor is left running which prevents damage to this mechanism.

The arrangement illustrated in Fig. 3 is for use on automobiles or trucks driven by electric motors. To this end a motor circuit VII is operatively connected as shown with the battery 25 of the automobile and includes an electro-magnetic switch 26 co-operating with an electro-magnet 27 and leads as shown to a control contact 28 of the ordinary control of the automobile which is operable as shown by a crank arm 29 and co-operates with a reversing crank arm 30 in the usual way to operate the electric motor of the automobile or truck as will be readily understood by those skilled in this art and so that when the electro-magnetic switch 26 is closed the automobile or truck may be operated in the usual way.

A circuit VIII in parallel with the motor circuit VII includes the battery 25 the electro-magnet 27 and the electro-magnetic switch 12 so that when closed the electro-magnet 27 will be excited to close the switch 26 and permit normal operations of the automobile or truck.

Another circuit IX in parallel with the motor circuit VII includes the concealed push-button switches 14, the electro-magnet 15, the thermostatic switch bar 16 and the battery 25 and when closed will excite the electro-magnet 15 to close the switches 12 and 17 and maintain them closed.

Another circuit X in parallel with the circuit VII includes the electro-magnetic switch 17, electro-magnet 15 and switch bar 16, and serves to excite the electro-magnet 15 when closed and thereby close switches 17 and 12.

Another circuit XI is connected as shown in parallel with the motor circuit VII and to include as shown the switch block 31 on the control drum and the heating coil 21 of the electro-magnetic switch and so that when the circuit XI is closed the heating coil 21 will be excited after a short planned period of time to heat the switch bar 16 sufficiently to cause bending thereof and opening of the circuit XI as will be readily understood.

In operation with the parts in the positions indicated in Fig. 3 which are the normal positions when the automobile or truck is stopped, the push-button switches 14 are closed as before by the driver of the automobile or truck. This excites electromagnet 15 to close switches 12 and 17 and maintain them closed thereby closing circuit VIII to excite electro-magnet 27 and close the motor circuit XI. At the same time the control lever 29 is manipulated to supply operating current to the electric motor of the truck or automobile thereby breaking the circuit XI and preventing operation of the switch bar 16 to break circuits IX and X and thereby permitting continued operation of the automobile or truck in the normal way. When the automobile or truck is stopped by manipulating control lever 29 to bring the switch block 31 to position to close the circuit XI the heating coil 21 will be automatically excited to cause switch bar 16 to break the circuits IX and X thereby automatically breaking the motor circuit and preventing operation of the automobile or truck until switches 14 have been again closed as explained above. In this manner unauthorized operation of the truck is prevented and the operating current automatically cut off shortly after the same has been brought to a stop, thereby preventing wastage of current and saving the time of the driver in stopping and starting the same.

In the arrangement illustrated in Fig. 4 an extension circuit XII is provided from circuit IX and leads to an additional switch block 32 on the control drum connected with the control lever 29. This arrangement prevents starting of the automobile when the switches 14 are closed in case the control lever 29 has been accidentally or mischieviously left or turned into position for operating the motor of the automobile or truck thereby adding an additional feature of safety.

While the preferred arrangements for carrying the invention into effect have been illustrated and described, these are capable of variation and modification without departing from the spirit of the invention. It is therefore not desired to be limited to the precise forms of construction and arrangements of parts disclosed but it is desired to include also such variations and modifications as fall within the scope of the appended claims.

We claim:

1. The combination with a vehicle propelled by power driven means and provided with means for regulating the efficacy of said propulsion means, of electrically operated thermostatic safety means automatically operated by said regulating means and adapted and arranged to discontinue said power driven means automatically upon regulation of said propulsion means to a predetermined low point of efficacy; and manually operable means for rendering said safety means inoperative.

2. The combination with a vehicle propelled by power driven means and provided with means for regulating the efficacy of said propulsion means, of safety means automatically operated by said regulating means and adapted and arranged to discontinue said power driven means automatically upon regulation of said propulsion means to a predetermined point of efficacy, and manually operable concealed means for rendering said safety means inoperative.

3. The combination with a vehicle propelled by power driven means and provided with means for regulating the efficacy of said propulsion means, of electrically operated thermostatic safety means automatically operated by said regulating means and adapted and arranged to discontinue said power driven means automatically upon regulation of said propulsion means to a predetermined low point of efficacy; and manually operable concealed means for rendering the safety means inoperative.

4. The combination with a vehicle propelled by an internal combustion engine provided with an ignition circuit and an adjustable throttle valve, of safety means adapted and arranged to interrupt said ignition circuit automatically upon adjustment of said throttle valve to a predetermined point; and manually operable means for rendering said safety means inoperative.

5. The combination with a vehicle propelled by an internal combustion engine provided with an ignition circuit and an adjustable throttle valve, of safety means adapted and arranged to interrupt said ignition circuit automatically after the lapse of a short predetermined period of time upon adjustment of said throttle valve to a predetermined point; and manually operable means for rendering said safety means inoperative.

6. The combination with a vehicle propelled by an internal combustion engine provided with an ignition circuit and an adjustable throttle valve of electrically operated thermostatic safety means adapted and arranged to interrupt said ignition circuit automatically upon adjustment of said throttle valve to a predetermined point; and manually operable means for rendering said safety means inoperative.

7. The combination with a vehicle propelled by an internal combustion engine provided with an ignition circuit and an adjustable throttle valve, of electrically operated thermostatic safety means adapted and arranged to interrupt said ignition circuit automatically upon adjustment of said throttle valve to a predetermined point; and manually operable concealed means for rendering said safety means inoperative.

8. The combination with a vehicle propelled by an internal combustion engine provided with an ignition circuit, a shift lever, and an adjustable throttle valve, of safety means adapted and arranged to interrupt said ignition circuit automatically upon adjustment of said shift lever and throttle valve respectively, to neutral position and to a predetermined point; and manually operable means for rendering said safety means inoperative.

9. The combination with a vehicle propelled by an internal combustion engine provided with an ignition circuit, a shift lever, and an adjustable throttle valve, of electrically operated thermostatic safety means adapted and arranged to interrupt said ignition circuit automatically after the lapse of a short predetermined period of time upon adjustment of said shift lever and throttle valve respectively to neutral position and to a predetermined point; and manually operable concealed means for rendering said safety means inoperative.

10. The combination with a vehicle propelled by an internal combustion engine provided with an ignition circuit and an adjustable throttle valve, of a first circuit in parallel with said ignition circuit and including an electrically operated thermostatic switch, an electro-magnet and a manually operable switch; a second circuit in parallel with said ignition circuit and including said electro-magnet and said thermostatic switch; a third circuit in parallel with said ignition circuit and including in series a switch operable by said throttle valve and the heating coil of said thermostatic switch; and normally open magnetic switches simultaneously operable by said magnet to close said second and ignition circuits.

11. The combination with a vehicle propelled by an internal combustion engine provided with an ignition circuit, a shift lever, and an adjustable throttle valve, of a first circuit in parallel with said ignition circuit and including an electrically operable thermostatic switch, an electro-magnet, and a manually operable switch; a second circuit in parallel with said ignition circuit and including said electro-magnet and said thermostatic switch; a third circuit in parallel with said ignition circuit and including in series a switch operable by said throttle valve, a switch operable by said shift lever, and the heating coil of said thermostatic switch; and normally open magnetic switches simultaneously operable by said magnet to close said second and ignition circuit.

12. The combination with a vehicle propelled by an electric motor and provided with a motor circuit and adjustably controlling means for rendering said circuit operative or inoperative, of safety means adapted and arranged to interrupt said circuit automatically upon adjustment of said controlling means to render said circuit inoperative; and manually operable means for rendering said safety means inoperative.

13. The combination with a vehicle propelled by an electric motor and provided with a motor circuit and adjustable controlling means for rendering said circuit operative or inoperative, of safety means adapted and arranged to interrupt said motor circuit automatically after the lapse of a short predetermined period of time upon adjustment of said controlling means to render said circuit inoperative; and manually operable means for rendering said safety means inoperative.

14. The combination with a vehicle propelled by an electric motor provided with a motor circuit and adjustable controlling means for said circuit, of electrically operated thermostatic means adapted and arranged to interrupt said motor circuit automatically upon adjustment of said controlling means to a predetermined point; and manually operable means for rendering said safety means inoperative.

15. The combination with a vehicle propelled by an electric motor and provided with a motor circuit and adjustable controlling means for rendering said circuit operative or inoperative, of safety means adapted and arranged to interrupt said circuit automatically upon adjustment of said controlling means to render said circuit inoperative; and manually operable concealed means for rendering said safety means inoperative.

16. The combination with a vehicle propelled by an electric motor provided with a motor circuit including a main magnetic switch and adjustable controlling means for said circuit of a first circuit in parallel with said motor circuit and including an electrically operated thermostatic switch, an electro-magnet and a manually operable switch; a second circuit in parallel with said motor circuit and including said electro-magnet and said thermostatic switch; a third circuit in parallel with said motor circuit and including in series a switch operable by said motor controlling means, an electro-magnet for said main magnetic switch, and the heating coil of said thermostatic switch; and normally open magnetic switches simultaneously operable by the electro-magnet in said first circuit to close said second and third circuits.

17. The combination with a vehicle propelled by an electric motor provided with a motor circuit including a main magnetic switch adjustable controlling means for said circuit and a switch operable by said controlling means to open said motor circuit when adjusted to motor stopping position of a first circuit in parallel with said motor circuit and including an electrically operated thermostatic switch, an electro-magnet and a manually operable switch; a second circuit in parallel with said motor circuit and including said electro-magnet and said thermostatic switch; a third circuit in parallel with said motor circuit and including in series a switch operable by said motor controlling means, an electromagnet for said main magnetic switch, and the heating coil of said thermostatic switch; and normally open magnetic switches simultaneously operable by the electro-magnet in said first circuit to close said second and third circuits.

18. The combination with a vehicle propelled by power driven means and provided with controlling means for rendering said propulsion means operative or inoperative, of safety means automatically operated by said controlling means and adapted and arranged to discontinue said power driven means automatically upon manipulation of said controlling means to render said propulsion means inoperative; and manually operative means for rendering said safety means inoperative.

19. The combination with a vehicle propelled by power driven means and provided with controlling means for rendering said propulsion means operative or inoperative, of safety means automatically operated by said controlling means and adapted and arranged to discontinue said power driven means automatically after the lapse of a predetermined period of time upon manipulation of said controlling means to render said propulsion means inoperative; and manually operative means for rendering said safety means inoperative.

JOHN M. SWANSON.
JOSEPH E. HUBER.
WALDEMAR N. OLSON.